(No Model.) 2 Sheets—Sheet 2.
J. G. EBERHART.
HARROW.
No. 357,911. Patented Feb. 15, 1887.
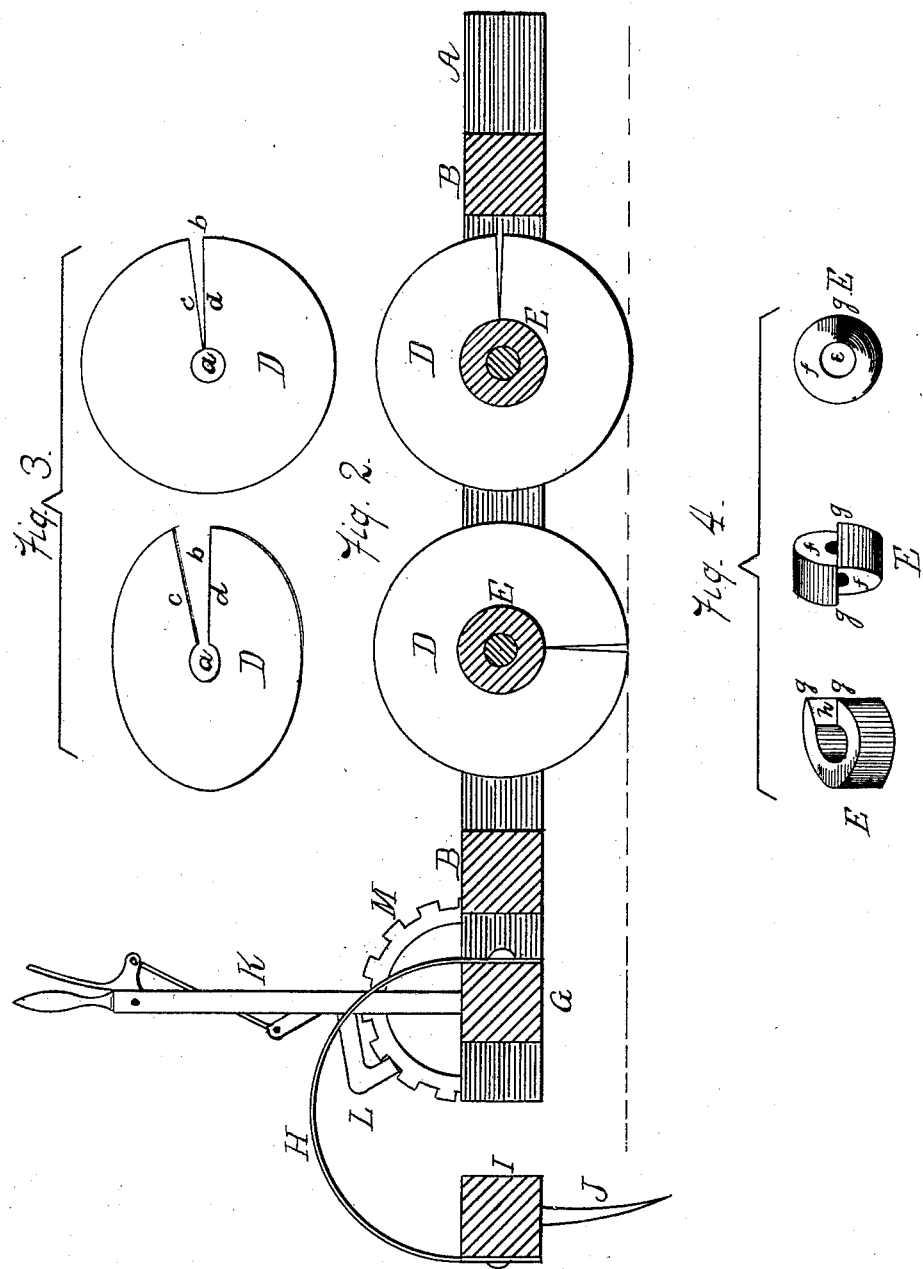
Witnesses
Inventor
John G. Eberhart.
By his Attorneys
Soule & Co.

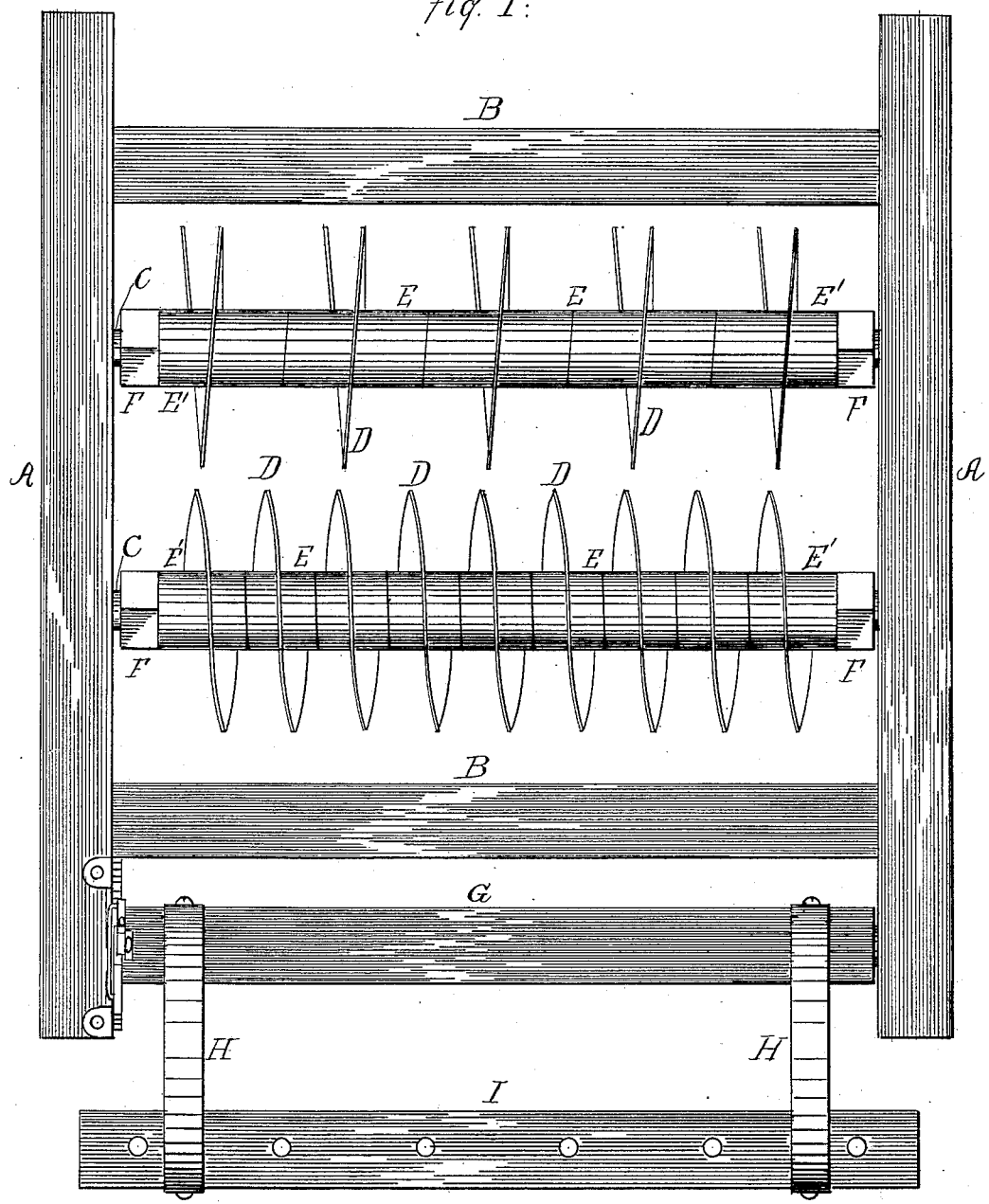

UNITED STATES PATENT OFFICE.

JOHN G. EBERHART, OF BIPPUS, INDIANA.

HARROW.

SPECIFICATION forming part of Letters Patent No. 357,911, dated February 15, 1887.

Application filed June 8, 1886. Serial No. 204,493. (No model.)

*To all whom it may concern:*

Be it known that I, JOHN G. EBERHART, a citizen of the United States, residing at Bippus, in the county of Huntington and State of Indiana, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This improved harrow is of the class known as "disk-harrows," in which one or more rotary shafts carry a series of disks which cut and pulverize the soil.

The present invention consists in a new and improved construction of the disks, in the mechanism whereby they are mounted on the shafts, and in a series of adjustably and flexibly mounted teeth in the rear of the disks.

The invention is illustrated in the accompanying drawings, in which—

Figure 1 is a plan view of the harrow. Fig. 2 is a longitudinal section thereof. Fig. 3 shows details of one of the disks, and Fig. 4 shows details of one of the collars or hubs which retain the disks in position.

The frame of the harrow is conveniently a simple parallelogram, consisting of two side rails, A A, and two end rails, B B. Crosswise of the harrow are rotatively mounted in the side rails two disk-shafts, C C. Each of these shafts carries at suitable intervals a number of the cutting-disks D D. The rear shaft carries, preferably, a larger number of disks than the front shaft, so that the rear disks may pulverize more finely the soil which has been partly pulverized by the front disks. Each disk is composed of thin metal, and instead of being a plane circular disk or a concave disk, as have been hitherto employed, it is, while circular in outline, bent into a spiral form. Each disk is formed out of a plane circular disk, in which a central eye, $a$, is cut to fit over the shaft C. A radial cut, $b$, is then made from the periphery of the disk to the central eye. The two straight edges $c\ d$ thus formed on the disk are spread apart and the entire disk bent into a spiral form. Each disk thus presents a sharp straight cutting-edge, which assists materially in causing the disk to cut into the soil and prevents the harrow from riding on the surface of the soil. The spiral shape of the disk has the effect of displacing the soil sidewise in passing through it, thus thoroughly agitating and loosening the same in the most efficient manner. Preferably, the spiral disks are oppositely arranged on the two shafts, as shown, so that the disks on one shaft displace the soil in a direction opposite to that imparted by those on the other shaft.

To insure the disks retaining their spiral shape, and at the same time to hold them firmly and securely upon the shaft, is the second object of this invention. To this end a series of collars or hubs, E E, are provided, which fit over the shafts and lock the disks in position. All of these collars, except the outside ones, are exactly alike, and there are shown on each shaft two of these collars between each disk. If desirable, as may be the case where it is wished to pulverize the soil very finely, as many disks may be used as there are collars. Each collar is circular in outline, and has a central eye, $e$, which fits over the shaft. Each side face, $f$, of each collar is a spiral conforming to the spiral of the disks. Each spiral face after completing one turn ends at each end in a straight line, $g\ g$, and these two lines are joined by a flat perpendicular face, $h$. The disks are held between the adjoining spiral faces $f\ f$ of adjacent collars, and the straight edges $c\ d$ of the disks rest against the faces $h\ h$ of the adjacent collars. One face $h$ of one collar rests, also, against the opposite face $h$ of the adjacent collar. The outer collar, E, on each shaft has only one spiral face, which is the inner face, the outer face being a plane circle. When all the disks and collars have been placed on the shaft C they are locked firmly together by means of nuts F F, fitting on the ends of the shaft. The disks are thus prevented from lateral displacement by the spiral faces $f\ f$ and from peripheral displacement by the faces $h\ h$.

In addition to the rotating disks, the harrow is also provided with a series of teeth of the usual character. Behind the rear end rail, B, and between the side rails, A A, is rotatively mounted a bar, G. To this bar is connected, by upwardly-arched springs H H, a tooth-bar, I, which carries the downwardly-extending teeth J J. These teeth are vertically adjustable and held in the desired position by a lever, K, fixed to the rotatively-mounted bar G, which carries a dog, L, which engages the teeth of a segmental rack, M, carried by the harrow-frame.

I claim as my invention—

1. A rotary harrow-shaft, in combination with spiral disks mounted at intervals thereon, each of said disks being formed of a circular sheet-metal disk having a central aperture and a radial cut extending from its periphery to said central aperture, the two edges formed by said cut being spread apart to give the spiral form to the disk, substantially as set forth, whereby each disk when the harrow is in operation furnishes a radial cutting-edge.

2. A rotary harrow-shaft and spiral disks having radial edges carried thereby, in combination with collars carried by said shaft between said disks, each of said collars having two spiral faces on its ends and two flat radial faces perpendicular to the spiral faces, said disks being held between the spiral faces of adjacent collars, with their straight edges abutting against the radial faces of the collars, substantially as set forth.

3. A harrow-frame, disk-carrying shafts mounted thereon, and spiral disks carried by said shafts, in combination with a tooth-bar rotatively and adjustably mounted in the frame behind said disk-shafts, harrow-teeth, and upwardly-curved springs connecting said teeth to said tooth-bar, substantially as set forth.

In testimony whereof I affix my signature in presence of two witnesses.

JOHN G. EBERHART.

Witnesses:
JAMES M. HILTEBRAND,
WM. J. HILLIGOSS.